United States Patent Office
3,337,448
Patented Aug. 22, 1967

3,337,448
SEWAGE TREATMENT PROCESS
Linvil G. Rich, Clemson, S.C., assignor to FMC Corporation, a corporation of Delaware
No Drawing. Filed Apr. 29, 1965, Ser. No. 451,990
5 Claims. (Cl. 210—3)

This invention relates to the treatment of sewage wastes. More particularly, it relates to a system for treatment of sewage aerobically at elevated temperatures. Still more particularly, it relates to a simplified system for treatment of sewage particularly adaptable to marine usage or other usages where the daily volume flow is relatively small.

Briefly, the process of this invention comprises culturing a mixture of microorganisms normally present in sewage wastes, in an aqueous medium containing raw sewage, by aerating the mixture while maintaining a temperature in the range between about 45° C. (113° F.) and 65° C. (149° F.), withdrawing from the aqueous medium being aerated a mixture containing predominantly non-viable materials and a minor amount of viable organisms, subjecting at least that portion of the withdrawn liquid which will be recycled to a heat treatment to render all microorganisms in the recycle stream non-viable and discharging an effluent containing viable organisms in quantities so limited that discharge into receiving bodies of liquid is possible without presenting contamination problems.

Plants for the treatment of aqueous wastes which have been scaled down versions of conventional activated sludge plants, and the like, have been expensive per unit of capacity, to build, to maintain and to operate. In addition, adoption of small plants to marine usage where a public health requirement for high B.O.D. removal is imposed, has been further complicated by the fact that ship motion tends to interfere with such primary operations as sludge settling.

Now it has been discovered, that aqueous wastes totaling a relatively low daily flow can be processed, in an operation simplified by the absence of a settling operation which provides efficient B.O.D. removal and discharges an aqueous effluent low enough in concentration of living or viable microorganisms to be safe for introduction into a receiving body of liquid, by establishing a main body of liquid containing a culture of microorganisms normally present in the sewage, introducing sewage into said culture to form a mixture and to maintain a loading in the range between about 25 pounds and 250 pounds of B.O.D. per 1000 cubic feet of aeration tank capacity, maintaining conditions of aeration and temperature conducive to growth of microorganisms at a rate close to the logarithmic growth phase, withdrawing from the culturing zone a portion of the liquid mixture, the contents of said mixture being viable microorganisms and non-viable material, separating a recycled portion of the withdrawn mixture, heating at least the recycled portion to pasturizing temperatures and returning said heated, recycle portion containing only non-viable material at a temperature capable of maintaining the total culture in the aeration zone at or near the thermophilic optimum, for mixing with incoming sewage and wasting the remainder of the withdrawn mixture.

More in detail, in one mode of operation, the process of treating sewage as applied to marine usage on small vessels comprises introducing sewage into a culturing or aeration zone in which a reduction in B.O.D. of the order of 70% to 85% is effected.

Sewage which is generally degritted and has the insoluble solids thereof comminuted, for example, to produce a dilute slurry, is introduced into the culturing zone and aeration effected on a continuous or intermittent basis. Gaseous medium, usually air under pressure, is introduced into the body of liquid constituting the culturing medium in quantities to satisfy the biochemical oxygen demand (B.O.D.). When the average flow of sewage is at a rate of about 125 gallons per hour of sewage having an average B.O.D. loading in the range between about 1 and about 2 pounds per hour, the air requirement will be of the order of 15 to 25 cubic feet of air per minute.

Inasmuch as sewage flow, for example, in small installations such as aboard marine vessels, is subject to considerable fluctuation over a twenty-four hour period, the sewage delivered to the microorganism culturing zone may be metered to even out the B.O.D. loading thereof.

Growth of microorganisms in the aeration zone containing a mixed culture of microorganism is fostered by maintaining the temperature of the liquid in the culturing or aeration zone at a level favoring rapid growth, for example, in the range between about 45° C. and 65° C. preferably a temperature maximizing the growth rate by being at or close to the thermophilic optimum of 55° C.

When temperature conditions being maintained in the culturing zone favors maximum growth of microorganisms, the rate of sewage feed or flow through rate for liquid medium may be adjusted to maintain the ratio of concentration of organic waste to the concentration of microorganisms in the culturing zone high, so that as a result, the growth of microorganisms is maintained close to the logarithmic growth phase. A high ratio of concentration of organic waste to concentration of microorganism in the aeration or culturing zone is in the range between about 5 pounds and 16 pounds, i.e., pounds of B.O.D., of organic waste per pound of viable organisms. Generally, the ratio is maintained in the range between about 5 pounds and 25 pounds of B.O.D. per pound of viable organisms, with between about 12 pounds and 18 pounds of B.O.D. per pound of viable organisms preferred.

In the culturing of these aerobic microorganisms it is necessary to have present, in addition to organic food material, an abundant supply of oxygen. When culturing these microorganisms at elevated temperatures, as required in this invention, it is possible to operate with a minimum of 0.3 milligram of dissolved oxygen per liter of suspension, i.e., 0.3 p.p.m. of oxygen. However, due to fluctuations in B.O.D. during the course of a twenty-four hour period, it is desirable to operate in the range between about 1 and about 5 p.p.m. of dissolved oxygen. This amount of air provides a safety margin to insure that the microorganisms will not have their growth arrested during periods of high influent flow by being starved for an adequate supply of air. A preferred range of dissolved oxygen is between about 1.5 p.p.m. and 2 p.p.m.

Organic food material fostering growth of microorganisms is available in this process from two sources, the influent feed and the pasteurized recycle stream. The pasteurized recycle contains non-viable materials. Utilization of some of the non-viable materials as food reduces the quantity of suspended solids to be wasted, thereby appreciably reducing the sludge disposal problem. In this system, the quantity of suspended solids reduction may consititute as much as 60%.

The presence of non-viable materials in predominant amounts in the aqueous suspension withdrawn from the aeration zone arises in part due to the recirculation of material. Appreciable quantities of aqueous suspension are withdrawn continuously or periodically from the aeration zone and the major portion of this withdrawn material is recycled back to the aeration zone after heat treatment to render the microorganisms non-viable. This recycled heat treated mixture may be introduced into the main body of liquid or may be mixed with incoming sewage in the influent channel prior to entering the main body of liquid. When recycling on a basis of a plurality of volumes of withdrawn suspension for each volume of incoming sewage, an equilibrium is reached at which the viable microorganisms in the withdrawn suspension is a very minor proportion of the total solids in the withdrawn suspension.

If it is desirable that the portion of the suspension withdrawn from the aeration tank which is to be wasted contain only non-viable material, the total volume of suspension withdrawn from the aeration zone may be heat treated and the waste product split out after such heat treatment as pasteurization. On the other hand, inasmuch as the viable microorganisms are present in only relatively low concentration, if the receiving body has appreciable size, the liquid suspension to be wasted may be discharged without further processing.

The portion of the withdrawn suspensions, which is to be recycled, is subjected to heat treatment to render the microorganisms non-viable. This heat treatment requires that the temperature of the recycle stream be raised at least to a pasteurizing level. Generally, the heat treatment is at a temperature in the range between about 70° C. (158° F.) and 100° C. (212° F.).

Heat treated aqueous suspension is recycled in volumes, generally in the range between about 2:1 and about 5:1, based upon the volume of the incoming feed and the temperature thereof. When influent sewage enters at a temperature of about 15° C. (59° F.) about three volumes of recycle material having a temperature of about 75° C. (167° F.) will maintain the temperature in the aeration zone close to the optimum of 55° C. (131° F.).

This process may be carried out in a tank of suitable configuration preferably insulated to conserve heat and fitted with means for mixing the tank contents, such as a turbine impeller or air mixing. Air is introduced into the tank contents generally adjacent the bottom by suitable means, which may be fine bubble or other apparatus such as coarse bubble introducers operating in conjunction with a mixer to effect dispersion.

In a preferred embodiment of the invention, suspensions withdrawn from the aeration zone, i.e., effluent from the aeration tank, passes to a suitable apparatus to direct the volume of effluent to be wasted to a discharge conduit system. The remainder of the effluent is passed to a separate conduit system which delivers the remainder to a pasteurizer where hot water or steam usually available in manufacturing plants or aboard vessels under a pressure of at least 50 pounds, may be used for heating. Pasteurizing may be accomplished in a conventional thin film apparatus or by having the liquid contact conventional heating coils or even by direct injection of steam. The hot aqueous suspension is thereafter pumped back to a point of mixing with influent sewage.

The invention will be further understood by reference to the following examples which describe preferred embodiments of the process.

*Example I*

Sewage from a small industrial plant is accumulated in an insulated tank fitted with a turbine mixing impeller and having a capacity of approximately 1000 gallons. Sewage with a five day B.O.D. of 1200 p.p.m. is introduced into the tank at a flow rate of approximately 125 gallons per hour, the sewage having a B.O.D. loading of 214 pounds of B.O.D. per day per 1000 cubic feet of tank capacity. The tank contents are maintained at approximately 55° C. Air is introduced into the tank through fine bubble dispersers at a rate of approximately 20 c.f.m.

A total of approximately 500 gallons per hour of liquid suspension is discharged from the aeration tank. Of this amount of liquid suspension, 125 gallons per hour are discharged to waste.

The material discharged to waste after an average detention time of 8 hours has a total B.O.D. of 0.25 pound (6 pounds per day which corresponds to approximately 240 p.p.m.) and the remainder of approximately 375 gallons per hour of liquid medium discharged from the aeration tank is conducted to a pasteurizer having a capacity of approximately 100 gallons, so that the retention time in the pasteurizer is approximately 15 minutes.

The pasteurizer consists of an insulated tank equipped with stirrer and heating coils. Steam at 250° F. is introduced into the heating coils. The temperature of liquid suspension issuing from the pasteurizing tank is approximately 75° C. Effluent discharged from this system has an average B.O.D. of 240 p.p.m. which is a reduction of approximately 80%.

*Example II*

Sewage aboard a marine vessel having thirty persons as crew, is delivered through an influent channel to an insulated tank of approximately 1000 gallon capacity. Tank contents are mixed by circulation induced by introduction of air in fine bubble form adjacent the bottom of the tank. Sewage having a five day B.O.D. of approximately 250 p.p.m. and a suspended solids of approximately 250 p.p.m. is introduced into the tank at a flow rate of approximately 110 gallons per hour. The tank contents are maintained at approximately 55° C. Air is introduced into the tank through fine bubble dispersers at a rate of approximately 16 c.f.m.

A total of approximately 450 gallons per hour of liquid suspension is discharged from the aeration tank. Of this amount of suspension, approximately 110 gallons per hour are discharged to waste. The remainder of approximately 340 gallons per hour of liquid suspension discharged from the aeration tank is conducted to a pasteurizer having a capacity of approximately 100 gallons, so that the retention time in the pasteurizer is approximately 14 minutes and then pumped to the influent channel for mixing with incoming sewage.

The pasteurizer consists of an insulated tank equipped with stirrer and heating coils. Steam under pressure is introduced into the heating coils in quantities to maintain the liquid suspension issuing from the pasteurizing tank at a temperature of approximately 75° C.

Effluent discharged to waste after an average detention time of approximately 8 hours consists approximately of 50 p.p.m. of B.O.D. and 100 p.p.m. of suspended solids.

Although the invention has been described in connection with specific embodiments thereof, it will be understood that these are not to be regarded as limitations upon the scope of the invention except insofar as included in the accompanying claims.

I claim:

1. The method of treating sewage which comprises establishing a main body of liquid containing a culture of microorganisms normally present in sewage wastes, introducing sewage having unsatisfied biochemical oxygen demand into said body of liquid to form an aqueous mixture, maintaining the mixture at a temperature in the range between about 45° C. and 65° C., aerating said mixture with quantities of air maintaining a dissolved oxygen content conducive to growth of microorganisms and elimination of biochemical oxygen demand, withdrawing from said main body of liquid a quantity of aerated mixture containing minor amounts of viable organisms, said quantity being equal to the volume of influent sewage plus a predetermined volume of aqueous medium to be recycled, separating a portion of said withdrawn mixture for discharge to waste, subjecting the remainder of said withdrawn aerated mixture to heat treatment at a temperature destructive of the activity of viable microorganisms, and recirculating heat treated material.

2. The method according to claim 1 wherein the quantity and temperature of aqueous medium being recirculated is correlated to maintain the main body of liquid in the temperature range specified.

3. The method of treating sewage which comprises establishing a body of liquid containing a culture of microorganisms normally present in sewage wastes, introducing sewage having unsatisfied biochemical oxygen demand into said body of liquid to form a mixture, maintaining the mixture at a temperature in the range between about 45° C. and 65° C., aerating said mixture with quantities of air maintaining a dissolved oxygen content conducive to growth of microorganisms and elimination of biochemical oxygen demand, discharging aerated mixture from said aeration zone in volumes in the range between about 1:2 and about 5:1 based upon the volume of influent sewage, separating a volume of said discharged aerated mixture equal to that of the incoming sewage and discharging it to waste, passing the remainder of said discharged aerated mixture through a heating zone where the temperature thereof is elevated to between 60° C. and 100° C. and the holding time is of the order of between 10 minutes and 30 minutes, recycling the heat treated mixture to said main body of liquid, the quantity and temperature being correlated to maintain the main body of liquid in the temperature range specified and continuing the introduction of air as long as there is introduction of sewage.

4. The method of treating sewage which comprises establishing a body of liquid containing a culture of microorganisms normally present in sewage wastes, introducing sewage having unsatisfied biochemical oxygen demand into said body of liquid to form a mixture, maintaining the mixture at a temperature in the range between about 45° C. and 65° C., aerating said mixture with quantities of air maintaining a dissolved oxygen content conducive to growth of microorganisms and elimination of biochemical oxygen demand, withdrawing a portion of said mixture from said aeration zone constituting a volume which is at least twice the volume of incoming sewage, the content of said mixture being predominantly non-viable materials and a minor amount of viable organisms, separating said portion into two parts, a first part equal in volume to that of the influent sewage and a remainder, discharging said first part to waste, subjecting the remainder to pasteurizing treatment at a temperature in the range between about 60° C. and 100° C. and recirculating said heat treated remainder to said main body of liquid.

5. The method of treating sewage which comprises establishing a body of liquid containing a culture of microorganisms normally present in sewage wastes, introducing sewage having unsatisfied biochemical oxygen demand into said body of liquid to form a mixture, maintaining the mixture at a temperature in the range between about 45° C. and 65° C., aerating said mixture with quantities of air maintaining a dissolved oxygen content conducive to growth of microorganisms and elimination of biochemical oxygen demand, withdrawing a portion of said mixture constituting a volume which is at least twice the volume of incoming sewage, the content of said mixture being predominantly non-viable materials and a minor amount of viable organisms, separating said portion into two parts, a first part equal in volume to that of the influent sewage and a remainder, discharging said first part to waste, subjecting the remainder to pasteurizing treatment at a temperature in the range between about 60° C. and 100° C. and recirculating said heat treated remainder to the influent channel for mixing with incoming sewage.

References Cited

UNITED STATES PATENTS 3,219,575  11/1965  Chapman et al. _____ 210—7

OTHER REFERENCES

Rudolfs, W. et al., White Water Treatment V. Aeration with Nonflocculent Growths, Sewage and Ind. Wastes, vol. 25, January 1953, pp. 70–78.

MORRIS O. WOLK, *Primary Examiner.*

MICHAEL E. ROGERS, *Examiner.*

UNITED STATES PATENT OFFICE
CERTIFICATE OF CORRECTION

Patent No. 3,337,448                  August 22, 1967

Linvil G. Rich

It is hereby certified that error appears in the above numbered patent requiring correction and that the said Letters Patent should read as corrected below.

Column 5, line 14, for "1:2" read -- 2:1 --.

Signed and sealed this 12th day of November 1968.

(SEAL)
Attest:

Edward M. Fletcher, Jr.                  EDWARD J. BRENNER
Attesting Officer                         Commissioner of Patents